United States Patent
Dorward et al.

(10) Patent No.: US 7,426,483 B1
(45) Date of Patent: Sep. 16, 2008

(54) GRAVESITE LOCATION INFORMATION SERVICE

(76) Inventors: David A. Dorward, 1595 Route 206, Bedminster, NJ (US) 07921; Paul Diamond, 555 North Ave., Apt. 1U, Fort Lee, NJ (US) 07024

( * ) Notice: Subject to any disclaimer, the term of this patent is extended or adjusted under 35 U.S.C. 154(b) by 544 days.

(21) Appl. No.: 10/942,680

(22) Filed: Sep. 16, 2004

(51) Int. Cl.
*G06Q 30/00* (2006.01)
(52) U.S. Cl. ...................................................... 705/26
(58) Field of Classification Search .............. 705/26–27
See application file for complete search history.

(56) References Cited

U.S. PATENT DOCUMENTS
7,014,101 B1 * 3/2006 Kennedy ..................... 235/375

OTHER PUBLICATIONS

"Nationwide Gravesite Locator," , http://web.archive.org/web/20040414023734/gravelocator.cem.va.gov/j2ee/servlet/NGL_v1, retrieved via WayBackMachine.org, Apr. 14, 2004.*

* cited by examiner

*Primary Examiner*—Jeffrey A. Smith
*Assistant Examiner*—Kalyan Deshpande

(57) ABSTRACT

The invention provides methods and systems for ordering and effectuating subscriptions to a gravesite location information service in connection with the interment of deceased individuals. In one embodiment, funeral service providers serve as a front end for taking orders for subscriptions to a third-party gravesite location information service. The invention also provides methods and systems for finding a selected gravesite using satellite or terrestrial positioning systems.

3 Claims, No Drawings

GRAVESITE LOCATION INFORMATION SERVICE

FIELD OF THE INVENTION

The invention relates to the fields of information, funeral and burial services.

BACKGROUND

For millennia, humankind has honored and commemorated deceased individuals by visiting their gravesites. In modern times, gravesite location information for a deceased individual is typically distributed in printed form to persons attending the funeral and/or interment of the deceased individual. For burials, this location information is typically in the form of a plot designation for a burial plot within a cemetery. Designated plots within a cemetery are generally located within a cemetery by reference to a map of the cemetery and/or various guideposts within the cemetery.

Gravesite visitation can be complicated by a number of problems. Printed records containing gravesite location information are often misplaced or lost, which creates a burden for those seeking to retrieve such information for a deceased individual. There is currently little or no incentive for funeral service providers, such as funeral homes, to provide a service whereby interested individuals can request or look up gravesite location information for deceased individuals of interest. Moreover, those interested in visiting a gravesite of a deceased individual often do not remember which funeral home handled the funeral for the deceased individual or which cemetery the deceased is interred in. Further, even when a party has the gravesite location designation for a gravesite they wish to visit, navigating their way to the gravesite can be confusing, even when a cemetery map is available. Finally, those intending to commemorate a deceased individual on a designated day of commemoration for that individual sometimes forget to do so despite their desire to remember and plan for the date.

SUMMARY

One aspect of the invention provides methods and systems for processing orders for subscriptions to a gravesite location information service in which funeral service providers act as front-end salespersons for a third party gravesite location information (GLI) subscription service provider. According to the invention, the funeral service providers can be compensated for acting in this capacity. The invention also provides methods and systems for effectuating the subscriptions and for obtaining desired gravesite location information made available pursuant to such a subscription.

A related aspect of the invention provides a method that includes the steps of: as a funeral service provider, offering a subscription to a gravesite location information service for a deceased or to-be-deceased individual to a party seeking or interested in obtaining funeral services for the individual; and in response to acceptance by the party to order the subscription, causing a subscription to a third-party gravesite location information subscription service provider that provides gravesite location information for deceased individuals upon request therefor, to be effectuated.

Another aspect of the invention provides methods and systems for finding or navigating one's way to a desired gravesite using the geographic coordinates of the gravesite. According to the invention, satellite positioning and/or terrestrial positioning systems can be employed to perform the navigation to the gravesite, for example, by using a handheld, electronic navigation device configured to work with at least one such positioning system.

DETAILED DESCRIPTION

The invention provides methods and systems for the ordering of a subscription to a gravesite location information service by a concerned party in connection with the interment of a deceased individual and for the implementation of the service and subscription.

In one embodiment, the invention provides utilizing a funeral service provider as a front-end for the taking and/or processing of orders for a subscription to a gravesite location information service from a party in connection with a gravesite for a deceased individual or to-be-deceased individual. The funeral service provider may be a funeral service provider that has or will provide funeral services for the deceased individual or who has been contacted by the party in connection with providing such services.

Another embodiment of the invention provides a method for processing an order for a subscription to a gravesite location information service that includes the steps of: receiving an order for a gravesite location information service subscription from a funeral service provider, the order having been placed with the funeral services provider by a party and the order including: identification information for a deceased individual selected by the party and gravesite location information for the deceased individual; and storing the identification information for the deceased individual and the gravesite location information for the deceased individual. In a first variation of this embodiment, the method further includes the step of providing the gravesite location information for the deceased individual in response to requests therefor. According to the invention, such requests may be generally honored for any member of the public (general authorization) or for a limited number of authorized individuals, for example, the party that placed the order for the gravesite location information service and/or other individuals selected by this party. Those skilled in the art will recognize that in the case where the number of authorized individuals is limited, a variety of methods can be used to restrict access to the authorized individuals, for example, pass-code protection as known in the art.

In a second variation of the embodiment, the method further includes the step of providing a subscription to the gravesite location information such that the gravesite location information for the deceased individual is provided to authorized individuals in response to requests for said information. In a third variation of the embodiment, the storing step includes storing the identification information for the deceased individual and gravesite location information for the deceased individual in a computerized database of gravesite location information system, that can be queried for, or accessed to provide, gravesite location information in response to requests therefor.

According to the invention, an order for a subscription to gravesite location information may also include a payment for the ordered gravesite location information service subscription. The method of the aforementioned embodiment and its variations can also include the further step of receiving payment for the subscription. As used herein, the term payment refers to any viable means of payment such as, but not limited to, currency, payment by check, payment by credit or debit card, and payment by instructions to debit an account such as a savings account, checking account, credit account or line of credit.

In one variation, the order further includes a payment for the ordered gravesite location information service subscription, the payment being in an amount equal to or larger than a minimum amount agreed upon by the funeral service provider and an entity that provides the gravesite location information service (the GLI service provider). In another variation, the payment is in an amount larger than a minimum amount agreed upon by the funeral service provider and the GLI service provider and the method of the embodiment further includes the step of: paying the funeral service provider an amount equal to the difference between the minimum amount and the payment for the ordered gravesite location information service subscription.

In still another variation, the method of the embodiment further includes the step of paying the funeral service provider a commission for the order. In a still further variation of the embodiment, the payment is in an amount larger than a minimum amount agreed upon by the funeral service provider and the gravesite location information subscription service provider and the method of the embodiment further includes the step of paying a commission to the funeral services provider for taking the order, the commission being equal to a percentage of an amount above the minimum amount. For example, the percentage can be in the range of 1% to 100% of the amount above the minimum amount. The minimum amount can be a minimum amount agreed upon between the funeral services provider and the provider of the GLI service for providing the GLI service in connection with the order. The minimum amount and/or the commission percentage can be set by the provider of the GLI service or can be negotiated between the funeral services and provider of the GLI service.

In a further variation, the order comprises a payment to the provider of the GLI service for the subscription and the funeral service provider is compensated for taking and submitting the order of the party, at least in part, by the presentation of one or more advertisements for the funeral service provider to parties who request gravesite location information for deceased individuals from the GLI service.

In another embodiment of the invention a funeral service provider pays a fee to a provider of a GLI service in exchange for permitting the funeral service provider to submit multiple orders for subscriptions to the GLI service from parties seeking funeral related services from the provider and have the subscriptions effectuated, for example, at no extra cost. This arrangement may allow the funeral service provider to submit a limited or unlimited number of orders over a limited or unlimited period of time, in exchange for the fee paid by the funeral service provider to the GLI service provider. The funeral service provider may then charge whatever they wish to each of the parties seeking or arranging funeral services for submitting an order for a subscription to the GLI service.

According to the invention, the funeral services provider can, for example, be selected from the group consisting of: a funeral home services provider such as, but not limited to, a funeral home, a funeral home director, manager or employee; a funeral officiant such as, but not limited to, a clergy member, a funeral officiant organization such as but not limited to a house of worship or religious institution; and a cemetery or a cemetery services provider or an employee thereof. Funeral homes in the United States typically provide at least one of the following services: providing a casket of choice; preparing the corpse for viewing and eventual burial, interment and/or processing; transporting the corpse from one location to another; assisting the customer in choosing a cemetery and/or gravesite; communicating with a cemetery or mausoleum to arrange for the burial or interment; communicating with a religious or spiritual advisor of the customer to arrange for officiation of the funeral; arranging a viewing of the corpse; and providing a place for the viewing. In one variation of the aforementioned embodiments of the invention, the method further includes the steps of: receiving an identifying indication of the particular funeral service provider from which an order for a subscription is received; and storing the indication. In another variation of the aforementioned embodiments, the method further includes the step of tracking the number of orders received from one or more particular funeral service providers, for example, over a selected period of time. In a subvariation, the method further includes a the step of: crediting an account of a particular funeral service provider for one or more orders received from that provider over a period of time; or generating a payment to a funeral service provider for one or more orders received from that funeral service provider over a period of time.

Another embodiment of the invention provides a method for processing an order for a subscription to a gravesite location information service that includes the steps of: offering a subscription to a gravesite location information service to a party for a deceased individual; and in response to acceptance by the party to order the subscription, causing a subscription to a third-party gravesite location information subscription service provider, which provides gravesite location information for deceased individuals upon request therefor, to be effectuated.

A related embodiment of the invention provides a method for processing an order for a subscription to a gravesite location information service that includes the steps of: offering to a party a subscription to a gravesite location information service for at least one deceased individual; and in response to acceptance by the party to order the subscription, sending or transmitting an order for the subscription to a third-party gravesite location information subscription service provider that provides gravesite location information for deceased individuals upon request therefor.

The party can, for example, be one who is seeking or arranging funeral services from a funeral service provider for the deceased individual or for another deceased individual. The offeror can, for example, be a funeral service provider and the offeree can, for example, be a party who has contacted the funeral services provider in connection with seeking funeral services for the deceased individual. The order may also include identification information for the deceased individual and gravesite location information for the deceased individual. In one variation, the order further includes at least a partial payment for the gravesite location information service with respect to the order. In a subvariation, the payment is payment from the party that placed the order with the funeral services provider. In a different subvariation, the payment is payment from the funeral services provider.

In another variation, the method further includes the step of taking payment from the party ordering the GLI service subscription in an amount above a minimum amount agreed upon with or set by the GLI service provider for providing the gravesite location information service with respect to an order and the step of sending the order further includes sending the agreed upon amount. In this manner, for example, a funeral service provider can be compensated for acting as a salesperson for the GLI service provider, i.e., as the front-end for the GLI service provider.

In another variation of the embodiments or their variations, the method further includes the step of receiving a commission from the GLI service provider for taking the order. In this manner also, a funeral service provider can be compensated for acting as a salesperson for the GLI service provider, i.e., as the front-end for the GLI service provider.

Another embodiment of the invention provides a method for providing subscriptions to a gravesite location information service, that includes the steps of: providing an ordering interface to a computerized gravesite location information system to a funeral service provider that enables the submission of an order of a customer, said order including identification information for a deceased individual or to-be-deceased individual selected by the customer and gravesite location information for the individual, said system being configured to receive and store the identification information for the individual and gravesite location information for the individual and provide the gravesite location information for the individual in response to requests therefor from authorized parties.

According to the invention, a request for gravesite location information can be in any form, for example, a query in which the name and/or other identifying information for a deceased individual is provided to a gravesite location information system, or a look-up-type request whereby the requestor directs themselves to gravesite location information for a desired individual by navigating, for example alphabetically by name of the deceased, to the desired information within a list or hierarchy of gravesite information for a plurality of deceased individuals that is provided by a gravesite location information system. A request interface according to the invention can, for example, be a query type interface or a look-up type interface or provide both options or a combination of the two.

In one variation of the embodiment the order further comprises payment for the GLI service subscription. Another variation of the embodiment further includes the step of receiving and/or processing payment for the customer's order. In a further variation of the embodiment or its variations, the method further includes the step of providing a commission payment to a funeral service provider for at least one order placed by the funeral service provider for a customer via the ordering interface.

Another embodiment of the invention provides a method for providing subscriptions to a gravesite location information service, that includes the steps of: providing an ordering interface to a computerized gravesite location information system, said interface configured to allow funeral service providers to submit an order to a computerized GLI system, said order including identification information for a deceased individual (or to be deceased individual) selected by a customer and gravesite location information for the decease individual (or to be deceased individual) said system being configured to receive and store the identification information for a deceased individual (or to-be-deceased individual) selected by a customer and gravesite location information for the deceased individual (or to be deceased individual) and to provide the gravesite location information for the deceased individual (or to be deceased individual) in response to requests therefor from authorized individuals; and providing a gravesite location request interface to the computerized gravesite location information system, said gravesite location information request interface being configured to allow authorized parties to request gravesite location information for a deceased individual and for providing the gravesite location information in response to the request(s) therefor.

In one variation of this embodiment, the step of providing an ordering interface includes serving at least one web page to a funeral service provider and the ordering interface includes the at least one web page. In another variation of this embodiment, the step of providing a GLI request interface includes serving at least one web page to a party seeking gravesite location information for a deceased individual and the GLI request interface comprises the at least one web page.

One embodiment of the invention provides a computerized gravesite location information system including: at least one computer processor; and computer accessible memory operably linked to the processor. The computer accessible memory comprises computer instructions directing the at least one computer processor to perform method steps of the invention. For example, according to the invention, the computer instructions can include instructions directing the processor to: receive an order for a subscription to a grave site information service, the order including identification of a deceased individual and gravesite information for that individual; storing the identification information and the gravesite information for the deceased individual in computer accessible memory; and providing the gravesite location information for the deceased individual in response to queries for that information. One manner in which the identification information and gravesite location information for deceased individuals can be stored, managed and maintained in computer accessible memory is in a relational database structure provided by relational database software, for example SQL database software. Accordingly, a GLI system according to the invention may further include a database comprising identification information and gravesite location information for deceased individuals and database software for maintaining the database. The system can also include computer instructions directing the at least one processor to indicate in a data structure, such as that provided by a relational database, that an order has been received from a particular funeral service provider and/or the number of orders received from a particular funeral provider, for example over a set period of time. In this manner, an accounting function is provided that tracks the orders received from particular funeral service providers. In a related variation, the system includes computer instructions that direct the at least one computer processor to credit an account of a funeral service provider or generate a payment to a funeral service provider for one or more orders received from the funeral service provider acting as a front end for the sale of subscriptions to the GLI service.

Communications to and from a GLI system according to the invention, for example to effectuate ordering or requesting and receiving gravesite location information can be performed by any suitable means across any suitable communications media or combination thereof. A GLI system may, for example, further comprise a web server, including the necessary software and hardware, to enable communication via the Internet or another network, and/or any necessary software and hardware to enable automated order processing or gravesite information request processing via telephone, and/or the necessary software and hardware to establish a server: client link to one or more data terminals that may be used, for example, by a human attendant to process subscription orders for, or to provide gravesite location information upon request to, parties communicating with the attendant by telephone.

Accordingly, interfaces provided according to the invention such as GLI service subscription ordering interfaces and GLI request interfaces, can be conveniently provided using a web server via the world wide web or by any other method including, but not limited to, interfacing by telephone via an automated attendant or with a human attendant using a data terminal linked to the GLI system via any communications medium or network. Further, providing an interface means providing an interface to a GLI system or subsystem, directly or via an intermediary such as a person, that is configured to carry out the tasks associated with the interface, for example, receiving orders for subscriptions to a GLI service or receiving requests for and providing gravesite location information.

According to the invention, an interface can be provided to a user wherever the user is located, for example via the world wide web, irrespective of where the system or subsystem is located, which may be anywhere in the world. For example, serving web pages in or into the United States that constitute an interface to a system or subsystem outside the United States is within the scope of the invention. Similarly, telephone communications in or into the United States that constitute an interface with a system or subsystem outside the United States are also within the scope of the invention. Those skilled in the art will also appreciate that components and functionalities of a system according to the invention may be geographically distributed.

One embodiment of the invention provides a method for providing gravesite location information, including the steps of: providing a gravesite location information request interface to a computerized gravesite location information system configured to provide gravesite location information for deceased individuals in response to requests therefor; and in response to a request made by a requester for gravesite location information for a selected deceased individual, providing the gravesite location information for that individual to the requestor.

According to the invention, a GLI requestor may, for example, interact with the interface, requesting and receiving the desired gravesite location information using a client computer system via a communications medium, such as communications network, such as the Internet. For example, a world-wide-web-enabled device such as a personal computer executing web browser software may be used by a requestor to interact with an interface to a GLI system, the interface being provided in the form of web pages served from a web server comprised by the system.

In one variation of the embodiment, the step of providing a GLI request interface includes providing the interface in the form of at least one web-page served to the requestor from a web server. In a related variation of the embodiment, the step of providing the gravesite location information for the deceased individual to the requestor comprises serving at least one page to the requester, the at least one web page including the gravesite location information for the deceased individual. According to the invention, the gravesite location information for a gravesite may, for example, include: the geographic coordinates of the gravesite, for example, terrestrial or satellite positioning system coordinates for the gravesite; a map showing the location of the gravesite; directions to the gravesite; a plot designation or identifier for the gravesite; an identification and/or address of the cemetery, mausoleum or burial area that encompasses the gravesite; traveling directions, such as driving and/or walking directions, to the gravesite; or any combination thereof. In another variation, in response to a request for the gravesite location information of a selected deceased individual, the gravesite location information for that individual is provided and, in addition, the gravesite location information for at least one friend or familial relation of that individual is provided or a hyperlink thereto is provided or an option or prompt, for example via telephone request interface, to receive the gravesite location information for the at least one friend or familial relation is provided.

In one variation of the invention, serving at least one web page comprising the gravesite location information comprises serving at least one web page comprising (i) a map of the cemetery, mausoleum, or area where the deceased is interred, or (ii) a hyperlink to such a map that is, for example, in the form of a web page or a downloadable image file.

According to the invention, in addition to the GLI, in response to requests for GLI or during the process by which a requestor of GLI accesses the GLI system via an interface, further information, such as but not limited to, advertisements, messages and hyperlinks, and further interface options, such a product and service ordering interfaces and donation processing interfaces or links thereto can be provided to the requester. For example, such further information and interface options can be presented in one or more web pages served to a requestor of GLI in embodiments where the GLI system provides a world wide web-based GLI request interface. The further information and interface options can be presented on one or more of the same web pages that present the GLI itself and/or on different web pages. Similarly, in embodiments of the invention utilizing a telephonic interface to a GLI system, for example via an automated or human attendant, such further information and interface options (ordering products or services or processing donations) can also be presented and implemented, for example by key pad entry and/or verbal communication.

In one embodiment of the invention, in response to a request for gravesite location information for a deceased individual, or during the process of making such a request, the requestor is presented with at least one advertisement and/or solicitation for a product or service. For example, the advertisements may be for funeral service providers, funeral homes, morticians, tombstone providers, casket providers, gravesite maintenance services, estate planners, attorneys, accountants, florists, hotels and limousine services. In a related embodiment of the invention, advertisements of third-party advertisers (not the GLI system or the requesters) are presented to requestors of GLI who access the GLI system via an interface, in exchange for payment, to the provider of the GLI system by the third-party advertisers or their representatives. Such payments by the advertiser or charging of a fee to the advertiser can be made before, after or during the presentation of such advertisements to those requesting GLI. In one variation, at least one advertisement is selected for presentation based on the locale of the gravesite, for example, the city or town of the gravesite.

In another embodiment of the invention, in response to a request for gravesite location information for a deceased individual or during the process of making such a request, the requestor is presented with at least one advertisement for a charitable organization. In a related embodiment, the GLI service provider charges a fee for the placement of such advertising. In a related embodiment of the invention, in response to a request for gravesite location information for a deceased individual the requester is solicited for a charitable donation to at least one charitable organization. In one variation, the requester is further provided with the opportunity to make such a donation. The charity may be one that is selected by or indicated by the party that initiated the subscription to the gravesite location information service. It may, for example, be a charity that the now-deceased selected and/or gave to or was involved with during their lifetime. The charitable organization can be of any sort, for example, a religious institution or house of worship, a medical research charity, an educational institution or fund or a political organization, irrespective of the tax-status of the organization or the governmental status of the organization in a jurisdiction.

One embodiment of the invention provides a method of processing charitable donations that includes the steps of: soliciting a requestor of GLI, for example one that requests GLI via an interface to a GLI system according to the invention, for a charitable donation or causing such a requestor to be solicited for a charitable donation by a third party. The requestor can, for example, be solicited while requesting or receiving GLI, before requesting the GLI, after receiving the GLI, or during any time the requestor is accessing the request interface. The GLI service provider can receive a commission payment or charge a fee for processing or generating donations to the charitable organization via solicitations initiated through or made through its GLI request interface. For example, a percent amount of a charitable donation or a flat fee can be accorded to the GLI service provider for generating the donation. In a related variation, the GLI system processes the charitable donation by receiving payment from the GLI requestor and pays the charitable organization the donation amount minus an amount retained by the GLI service provider as a fee (fixed or percentage-based). In another related variation, the processing of charitable donations arising from solicitations made via the GLI request interface are routed to a third-party donation processing system or center, for example those that may be run by or contracted by a charitable organization, for processing and the GLI service provider is provided with a commission payment, on a flat fee or percentage-wise basis, for such donations by the charitable organization or their agents.

A related embodiment of the invention provides that a tally of monies collected for the charity from requestors of GLI for a particular deceased individual or selected group of individuals is kept by the GLI system and, in further response to requests for gravesite location information for that individual or one in the group, the tally is provided to the requestor of the gravesite location information. In one variation, solicitations for charitable donations made to parties requesting GLI from the GLI system are presented as solicitations for donations "in the name of" or "in memory of" the deceased individual. In this manner, charitable giving can be encouraged.

In one embodiment of the invention, the requestor of GLI is presented with an advertisement or identifying information for a funeral service provider, for example an image and/or identification of the funeral home and/or house of worship that was involved in the funeral for the deceased individual for whom the gravesite location information is being requested. The presentation of the advertisement can, for example, be made in response to a request for gravesite location information for a deceased individual, be made during the process of making such a request, or be made during access of the requestor to a request interface generally. In a similar embodiment, the GLI requestor is presented with at least one advertisement for a funeral service provider, for example an image and/or identification of the funeral home and/or house of worship, that was not involved in the funeral for the deceased individual for whom the gravesite location information is being requested. For embodiments in which the GLI system provides a word-wide web-based GLI request interface, such advertisements and/or identifying information can be presented in one or more web pages served to a requestor of GLI.

In another embodiment of the invention, the requestor of GLI is presented with an advertisement for and/or the opportunity to purchase products and services associated with the remembrance or commemoration of the death of the deceased individual for who the gravesite location is being requested. Such products may include, but are not limited to floral products such as bouquets and wreaths to be placed at the gravesite or delivered to selected individuals, and such services can include, for example, placement of the floral products at the gravesite or their delivery to specified individuals and gravesite maintenance services. For embodiments in which the GLI system provides a word-wide web-based GLI request interface, such advertisements and/or ordering options can be presented in one or more web pages served to the requestor of GLI. For example, an advertisement and/or contact information for a florist local to the cemetery in which a deceased individual for whom GLI has been requested can be presented to the requester of the GLI information for that individual on the same web page in which the GLI information is provided or on a different web page. The advertisement may, for example, also include an embedded hyperlink so that within a web browser environment, clicking on the advertisement will direct the requestor to a website of the florist, such as an online order processing website of the florist. In embodiments of the invention where a GLI system is accessed via a telephonic interface, the invention provides that the requestor can be prompted for their interest in purchasing goods or services or in making a charitable donation. The processing of such an order or donation may, according to the invention, be made in whole or in part via the GLI system, or the requester may be routed telephonically to a separate order taking or donation processing center or system.

In another embodiment of the invention, in response to a request for gravesite location information for a deceased individual, the requestor is presented with at least one message selected by or submitted by the party who ordered the subscription to the GLI service. In still another embodiment, the message includes an obituary for the deceased individual. In a further embodiment the message is selected or submitted by a family member of the deceased. In another embodiment, the message can be selected by or submitted by the now-deceased individual. The message may be of any sort, including but not limited to a religious message or a eulogy for the deceased individual. The message can be presented by any means including, but not limited to, text, graphics, video and/or audio. In one variation, the message comprises video and/or audio that is from the funeral for the deceased individual, for example a eulogy given for the deceased individual as part of the funeral. In another variation, the message comprises video and/or audio of the now deceased that was recorded during their lifetime.

Gravesite location information according to the invention can, for example, comprise broad descriptions of the cemetery or area of burial or interment, narrower descriptions of the plot or interment location by a designation recognized for the interment area, and/or descriptions of the geographic coordinates of the gravesite with precision. The precise geographic location of a gravesite can be determined, for example, by using a terrestrial positioning, or satellite positioning system, or combinations thereof. In one embodiment of the invention, the precise geographic location of a gravesite is determined by a funeral service provider in connection with the burial or interment of a deceased individual, by using a terrestrial positioning or satellite positioning system enabled locator device. One embodiment of the invention provides that such coordinates are used to locate a desired gravesite using a terrestrial positions or satellite positioning locator device, irrespective of how the precise geographic coordinates of a gravesite are initially determined and recorded.

Satellite-based geographic coordinate finding and locating systems that are suitable for use according to the invention include, for example, the Global Positioning System (GPS), the European Galileo system and the Russian GLONASS system. Hand-held locator and direction-finding devices utilizing satellite position systems are widely available.

Terrestrial positioning systems suitable for use according to invention include, for example, Enhanced Observed Time Difference (E-OTD), Time Difference of Arrival (TDOA), Angle of Arrival (AOA). Each of these wireless techniques can be utilized using a hand-held locator device, such as a cellular telephone handset configured to utilize one or more of the systems.

E-OTD systems operate by placing location receivers or reference beacons, overlaid on the wireless network as a location measurement units (LMU) at multiple sites geographically dispersed in a wide area. Each of these receivers has an accurate timing source and when a signal from at least three base stations is received by an E-OTD software enabled mobile and the LMU, the time differences of arrival of the signal from each cell site at the handset and the LMU are calculated. The differences in time stamps are then combined to produce intersecting hyperbolic lines from which the location is estimated.

The TDOA technique works by measuring the exact time of arrival of a handset radio signal at three or more separate cell sites. Because radio waves travel at a fixed known rate (the speed of light), by calculating the difference in arrival time at pairs of cell sites, it is possible to calculate hyperbolas on which the transmitting device is located. The TDOA technique typically uses existing receive antennas already present at a cell site. In multi-path environments (urban areas) it may be necessary to make measurements with four antennas to overcome the effects of the multi-path. This location technique works with any handset, including legacy units and requires modifications to the network only.

The AOA technique determines the direction of arrival of a handset's signal at a cell site. The phase difference of the signal on elements of a calibrated antenna array mounted at a cell site provides the angle of arrival. The intersection of the angles from two or more sites provides the location. Typically the AOA technique is used to augment the TDOA approach of a location system. One example of this is the coverage of a rural highway where the cell site arrangement often in a line along the highway. TDOA-only systems must overcome increased propagation loss for a three-site reception, but by including AOA on the highway sites, an accurate position calculation can be obtained from only two sites.

One embodiment of the invention provides a method of retrievably-archiving gravesite location information that includes the steps of: determining the geographic coordinate information of at least one gravesite of a selected deceased individual; and entering the geographic coordinates information for the gravesite and identification information for the deceased individual into a computerized database. In one variation, the step of determining the geographic coordinate information is performed using a satellite positioning system or a terrestrial positioning system or a combination thereof. In another variation, the step of determining the geographic coordinates of the gravesite is performed by a funeral services provider. In a related variation, the step of entering the geographic coordinate information and identification information into a database is performed by a funeral services provider via an interface to a computerized GLI service system that maintains a database of such information.

Another embodiment of the invention provides a method of retrievably-archiving gravesite location information that includes the step of: maintaining a database comprising the geographic coordinates of at least one gravesite for a deceased individual and identification information for the individual, which is relationally associated with the geographic coordinates. A variation provides a method that includes the step of: maintaining a database comprising the geographic coordinates of the gravesites of a plurality of deceased individuals and identification information for the individuals, in which the identification information for a deceased individual and the corresponding geographic coordinate information for their gravesite is relationally associated. In another variation, the method further includes the step of charging a fee for adding the geographic coordinate information for a deceased individual to the maintained database. In still another variation, the method further includes the step of charging a fee for providing access to the geographic coordinate information for a deceased individual in the maintained database. In a further variation of this embodiment or its variations, the gravesite for the deceased individual is located in a cemetery.

A further embodiment of the invention provides a method for providing gravesite location information, including the steps of: maintaining a database comprising the geographic coordinates of at least one gravesite for a deceased individual and identification information for the individual; and providing the geographic coordinates of the gravesite for the at least one deceased individual in response to a request therefor. One variations of this embodiment further provides the step of charging a fee (i) to add the geographic coordinates for the deceased individual to the database, (ii) to maintain the geographic coordinates for the deceased information in the database, and/or (iii) for providing the geographic coordinates for the gravesite of the deceased individual to a requester thereof.

Another embodiment of the invention provides a method for finding a gravesite, i.e., a method for guidance to or guided travel to a gravesite, including the steps of: retrieving the geographic coordinates of a gravesite for a selected deceased individual from a database including the geographic coordinates of gravesites for deceased individuals; and employing the retrieved geographic coordinates to find the gravesite. In one variation, the step of employing the retrieved geographic coordinates to find the gravesite includes using a hand-held, electronic locator device to find the gravesite location using the geographic coordinates.

Those skilled in the art will readily appreciate that there are many ways within the scope and spirit of the invention by which a user can be guided to the geographic coordinates of a selected gravesite using a locator device. For example, a computerized hand-held geographic locator and direction finder device having a display, as known in the art, can be employed in the following manner. The geographic coordinate information for a selected gravesite, i.e., the desired destination, is entered into or programmed into the locator device. The device also determines its own current location. The device then provides or indicates the direction or directions from the current location to the selected gravesite. The directions to the destination gravesite can be provided in any manner. For example, if the locator device is configured to determine its own orientation, for example with respect to the compass points, the direction to the desired gravesite can conveniently be indicated by the display of arrows, or other vector indicators. In another example, directions from a current position of the locator device to the desired gravesite can be provided in the form of instructions made with respect to landmarks, traveling routes such as roads and paths, and/or distances. Such instructions can be generated by the handheld device itself if it comprises the necessary geographic information or in conjunction with a non-local computerized direction calculating system that the device communicates with.

A further embodiment of the invention provides a method for finding a gravesite, that includes the steps of: providing the geographic coordinate information for the gravesite to a hand-held electronic locator device that indicates the direction to geographic coordinates entered into it; and following the directions provided by the hand-held locator device to the gravesite. In one variation, the gravesite is a gravesite of a recently deceased individual. In another variation, the gravesite is a gravesite of an individual who was living at some time during the life of a person who performs the method to find the gravesite.

Another embodiment of the invention provides a method for finding a gravesite that includes the steps of: entering a cemetery; and in the cemetery, following directions to a desired gravesite that are provided by a hand-held electronic locator device that has been provided with the geographic coordinates of the desired gravesite and that determines the direction to the gravesite based on the geographic coordinates. In one variation, the hand-held electronic locator device is a satellite positioning system enabled device configured to determine the direction(s) to desired gravesite using, at least in part, a satellite positioning system. In another variation, the hand-held electronic locator device is a terrestrial positioning system enabled device configured to determine the direction(s) to the desired gravesite using, at least in part, a terrestrial positioning system.

As a variation of any the embodiments and variations of the invention described herein, the deceased individual(s) can be recently deceased. In another variation, the deceased individual(s) died within 1, 2, 3, 4, 5, 10, 20, 30, 40, or 50 years. In a further variation, the party that orders a subscription to GLI service in connection with a deceased individual is a person who was living during a period of time in which the deceased individual lived. In another variation, a party that requests gravesite location information for a deceased individual or a party that uses gravesite location information, for example, for navigation to a gravesite, is a person who was living during a period of time in which deceased individual lived.

A still further aspect of the invention provides methods and systems for providing reminders to parties of the anniversary of death of particular deceased individuals, the anniversary of birth of the particular deceased individuals and/or whatever other date(s) may be selected to commemorate the particular deceased individuals. The reminders can be communicated by any method, for example, electronically by e-mail, web pages, telephone, text messaging (e.g. SMS), facsimile transmission or by mail or courier. The invention provides a method that includes the step of communicating a reminder of the commemoration date for a deceased individual to a preselected recipient party on at least one date in advance of a date selected to commemorate the deceased individual and/or on that date. For example, the reminder can be sent to the recipient 7 days before and/or 3 days before, and/or 1 day before the commemoration day and/or on the commemoration day. According to the invention, the method can be at least partially computer-implemented.

According to the invention, a commemoration day reminder communication may include a precise or non-precise indication of the temporal proximity of a commemoration day for a deceased individual and/or indicate the date of the commemoration day. A commemoration day reminder communication can also comprise gravesite location information for the deceased individual, a hyperlink thereto, a prompt or option to receive the information and/or instructions for accessing the information, thereby facilitating visitation of the gravesite of the deceased individual by the party receiving the reminder. Identification information for the deceased individual with respect to whom the reminder is being sent can also be included in the reminder communication. A commemoration day reminder communication can include at least one advertisement, for example, the types of advertisements described hereinabove. Fees can be charged of the advertisers or their representatives for the placement of advertisements in the reminders. A commemoration day reminder communication can also include at least one solicitation for a charitable donation. Fees can be charged for the placement of such solicitations in the reminders and/or a commission can be paid to a provider of the reminders based on charitable donations elicited as a result of the solicitations.

A communication prompting access to commemoration day reminder information is also a commemoration day reminder communication, as referred to herein. For example, an e-mail message not containing at least one information element from the group consisting of identification information for a deceased individual, commemoration day information for that individual and gravesite location information for that individual, but that contains a hyperlink to at least one missing element of that information, a prompt or option to receive information which when provided comprises at least one missing element of that information, or instructions for accessing information which when provided comprises at least one missing element of that information is also a commemoration day reminder communication according to the invention. The communication that provides the at least one element of the missing information is also a commemoration day reminder communication.

One embodiment of the invention provides a computer-implemented method for reminding a party of an upcoming day that commemorates a deceased individual that includes the steps of: storing identification information for a deceased individual; storing contact information for at least one party designated to receive a reminder communication with respect to a commemoration day for the deceased individual; and sending a reminder communication of the commemoration day for the deceased individual to the at least one party designated to receive the reminder communication, at least one time in advance of the commemoration day and/or on the commemoration day. In one variation of the embodiment, the commemoration day reminder communication includes gravesite location information for the deceased individual, or a hyperlink thereto or a prompt or option to receive the gravesite location information or instructions for accessing the gravesite location information. Another variation of the embodiment further includes the steps of: storing gravesite location for the deceased individual; and providing the gravesite location information for the deceased individual to the party designated to receive the commemoration day reminder communication. In a subvariation of this variation, the step of providing the gravesite location information for the deceased individual to the designated party includes providing the GLI in or with the commemoration day reminder communication that is sent to the designated party. In a variation of the embodiment and the previous variations, the contact information for the designated party includes an e-mail address and the commemoration day reminder communication is an e-mail communication.

Another embodiment of the invention comprises a computerized system that sends reminders of a commemoration day of a deceased individual to selected parties. Such a commemoration day reminder system comprises at least one computer processor and computer accessible memory comprising, identification information for the at least one deceased individual, commemoration day information for the at least one individual and contact information for at least one party to whom a reminder of the commemoration date for a deceased individual will be sent. The computer accessible memory also comprises computer instructions directing the at least one computer processor to perform the step of: sending a reminder of the commemoration date for a deceased individual to a party designated to receive the reminder, at least one time in advance of the commemoration day and/or on the commemoration day. The computer memory of the system can also comprise gravesite location information for the at least one deceased individual. The reminder that is sent can then also include the gravesite location information for the deceased individual, a hyperlink thereto, a prompt or option to receive the gravesite location information and/or instructions for accessing the information. The system also includes, or is provided with access to, a calendar function comprised by computer instructions and any necessary hardware, for example, as known in the art, in order to track the change in dates. The system also includes whatever software and hardware are necessary to effectuate the sending of the reminder communication by a particular method. For example: to send e-mail reminders, the system can be provided with an electronic mail server connected to a communications network such as the Internet and the contact information for the recipient will include an e-mail address; to send reminders by facsimile transmission, the system can be provided with a fax modem and telephony connection, and the contact information for the recipient will include a telephone number for a fax receiver; and to send reminders by mail, the contact information will include a postal address and the system can be provided with a digital printer to print reminders that are then mailed to the recipient.

The invention also provides various embodiments specifying the characteristics of the deceased individual with respect to whom commemoration day reminders are sent and the relation between such an individual and a party designated to receive such reminders. In one embodiment, the deceased individual is a recently deceased individual. In another embodiment the deceased individual is an individual who died within 50, 40, 30, 20, 15, 10, 5, 4, 3, 2 or 1 years of the time that a commemoration day reminder communication is sent. In a further embodiment, the deceased individual is not a historic figure. In another embodiment, the deceased individual and the party designated to receive the commemoration day reminder communication are familial relations. In a further embodiment, the deceased individual and the party designated to receive the commemoration day reminder communication were friends, colleagues or acquaintances during a period while both were living. In another embodiment, the deceased individual died during the lifetime of the designated party that is sent the commemoration day reminder.

Any of the computerized GLI systems describe herein can also be configured to provide a commemoration day reminder function. Accordingly, this can be achieved by providing those systems with computer instructions in computer memory directing the at least one computer processor to perform the steps of: receiving and/or storing contact information for a party designated to receive such reminders in computer accessible memory; and sending a reminder of the commemoration date for a deceased individual to the party designated to receive the reminder, at least one time in advance of the commemoration date and/or on the commemoration date. As described above, such a system will also include a calendar function to track the changing of dates.

A commemoration day reminder system according to the invention, including a GLI system so-configured, can be configured to include interfaces and functions to permit a party, such as an authorized party, to enter date of death information once it becomes known and/or edit date of death information, and/or to add and/or delete parties designated to receive the reminders and/or edit their contact information, the commemoration day date(s) information, and the frequency of reminders and/or times and dates on which they are sent.

In embodiments of the invention described herein in which funeral service providers submit the orders of parties for subscriptions to a GLI service with respect to a deceased or to-be-deceased individual, the orders may further comprise contact information for at least one party designated to receive a commemoration day reminder communication with respect to the deceased individual or the to-be-deceased individual, once deceased. The order can still further comprise date of death information for the deceased individual and/or date of commemoration information with respect to the individual (birthday, date of death, other). In this manner, a GLI system configured to provide commemoration day reminder communications can be provided with the information necessary to carry out that task.

In embodiments of the invention wherein the GLI for an individual is requested via a request interface by a requester, the requestor can be prompted to provide contact information so that they can be provided with commemoration day reminders with respect to the individual for whom the GLI was requested. In embodiments of the invention in which the requested GLI information for an individual is provided by one or more web pages served to the requester of the GLI information in response to their request, at least one of these web pages or another web page can be served to the individual in which contact information such as, but not limited to an e-mail address, of the requestor or a party designated by the requester can be entered and transmitted to a computerized system configured to provide commemoration day reminder communications, such as but not limited to e-mail communications, to parties for whom contact information has been provided for such purpose. In this manner, requesters of GLI for an individual can designate themselves or others, to receive commemoration day reminder communications for the individual for whom GLI was requested. In this process, a GLI system configured to provide commemoration day reminder communications is provided with the information necessary to carry out its reminder function.

As referred to herein, the term gravesite means a place of interment or keeping of the remains of a deceased individual. Accordingly, a gravesite includes, but is not limited to a grave, whether marked or unmarked, and an aboveground or belowground mausoleum space. A gravesite may be located in a cemetery or in another setting. Further, as referred to herein, the expression "deceased individual" means a no-longer-living human being of any developmental stage or a no-longer-living animal, such as a pet. Identification information for a deceased or to-be-deceased individual can be of any sort including, but not limited to: the name(s) of the individual; the social security number or tax identification number of the individual; the birth date of the individual; the year or date of death of the individual; a description of the familial relation(s) of the individual; genealogy of the individual; a description of the jurisdiction(s) in which the individual was born, lived and/or died; affiliations of the individual; the national and/or ethnic origins of the individual; and any combination thereof.

A subscription is an arrangement or effectuated agreement whereby the party that orders the subscription and/or any other limited or unlimited group of persons is provided with the information for which the subscription was established, or access thereto, on request. Subscriptions obtained according to the invention can be for a finite duration or for an unlimited or indefinite period of time. It should also be understood that, according to the invention, the parts of an order for a subscription to a GLI service can be sent to the provider of the subscription together or separately, at the same time or at different times, and by same method or by different methods.

The embodiments and examples presented herein are meant to illustrate various aspects of the invention and should not be construed as limiting the scope of the invention. Numerous variations within the scope and spirit of the present invention may be apparent to those skilled in the art. Accordingly, the scope of the invention should be determined with respect to the claims and all equivalents to which they are entitled.

What is claimed is:

1. A computerized gravesite location information system, comprising:
   a web server;
   at least one computer processor; and
   computer accessible memory operably linked to the processor, wherein the memory comprises computer instructions directing the at least one computer processor to perform the steps of:
      providing via the world wide web an ordering interface to the computerized gravesite location information system configured for funeral service providers to submit orders from customers for subscriptions for a gravesite location information service,
      receiving an order for a gravesite location information service subscription from a funeral service provider via the ordering interface, the order having been placed with the funeral services provider by a customer and the order comprising identification information for a deceased or to-be-deceased individual selected by the customer and gravesite location information for the individual,
      storing the identification information for the individual and gravesite location information for the individual,
      receiving an identifying indication of the particular funeral service provider that submits the order for the subscription,
      tracking the number of orders received from one or more particular funeral service providers over a period of time,
      crediting an account of a particular funeral service provider for one or more orders received from that provider over a period of time, or generating a payment to a particular funeral service provider for one or more orders received from that funeral service provider over a period of time,
      providing via the world wide web a gravesite location information request interface to the computerized gravesite location information system configured to permit authorized parties to request and receive gravesite location information for at least one deceased or to-be-deceased individual with respect to whom a subscription for the gravesite location information service has been established, and
      providing via the gravesite location information request interface the gravesite location information for an individual with respect to whom a subscription for the gravesite location information service has been established in response to a request therefor.

2. A method for providing gravesite location information, comprising:
   providing a computerized gravesite location information system comprising:
   a web server;
   at least one computer processor; and
   computer accessible memory operably linked to the processor; wherein the memory comprises computer instructions directing the at least one computer processor to perform the steps of:
      providing via the world wide web an ordering interface to the computerized gravesite location information system configured for funeral service providers to submit orders from customers for subscriptions for a gravesite location information service,
      receiving an order for a gravesite location information service subscription from a funeral service provider via the ordering interface, the order having been placed with the funeral services provider by a customer and the order comprising identification information for a deceased or to-be-deceased individual selected by the customer and gravesite location information for the individual,
      storing the identification information for the individual and gravesite location information for the individual,
      receiving an identifying indication of the particular funeral service provider that submits the order for the subscription,
      tracking the number of orders received from one or more particular funeral service providers over a period of time,
      crediting an account of a particular funeral service provider for one or more orders received from that provider over a period of time, or generating a payment to a particular funeral service provider for one or more orders received from that funeral service provider over a period of time,
      providing via the world wide web a gravesite location information request interface to the computerized gravesite location information system configured to permit authorized parties to request and receive gravesite location information for at least one deceased or to-be-deceased individual with respect to whom a subscription for the gravesite location information service has been established, and
      providing via the gravesite location information request interface the gravesite location information for an individual with respect to whom a subscription for the gravesite location information service has been established in response to a request therefor;
   presenting a solicitation for a charitable donation to a requestor who accesses the gravesite location information request interface; and
   in response to a request made by a requestor via the gravesite location information request interface for gravesite location information for a selected deceased individual, providing the gravesite location information for that individual to the requester.

3. The method of claim 2, further comprising the step of:
   receiving a commission payment for a charitable donation made as a result of presenting the solicitation.

* * * * *